Jan. 20, 1970  A. R. MILLER ET AL  3,490,871
PROCESS FOR PRODUCING HYDROGEN FROM WATER USING AN ALKALI METAL
Filed Oct. 19, 1965

ALAN R MILLER  INVENTORS
HAROLD JAFFE
BY
Edward O'Ansell ATTORNEY
Albert S Miller AGENT

United States Patent Office 3,490,871
Patented Jan. 20, 1970

3,490,871
PROCESS FOR PRODUCING HYDROGEN FROM WATER USING AN ALKALI METAL
Alan R. Miller, Alamo, and Harold Jaffe, Walnut Creek, Calif., assignors to Aerojet-General Corporation, El Monte, Calif., a corporation of Ohio
Filed Oct. 19, 1965, Ser. No. 498,019
Int. Cl. C01b *1/07;* B01j *7/02*
U.S. Cl. 23—210                                  2 Claims

ABSTRACT OF THE DISCLOSURE

A process for producing hydrogen gas from water involving the reaction of an alkali metal, preferably cesium, and water to produce hydrogen gas and an alkali metal-oxygen compound and thereafter the alkali metal-oxygen compound is regenerated and recycled for reduction of a further quantity of water.

---

This invention generally relates to the production of fuels and more particularly to a novel process for producing hydrogen and hydrogen-nitrogen compounds from commonly available materials.

The field utilization of conventional hydrocarbon (petroleum) fuels requires an almost overwhelming logistics effort. Since such fuels are not susceptible to production in the field, there is a severe problem of transportation and/or storage. The development of self-sustaining mobile nuclear reactors and multi-fuel turbines and reciprocating engines promise an eventual solution to this problem.

Hydrogen and hydrogen-nitrogen compounds such as anhydrous ammonia have been identified as fuels which could replace or at least supplement petroleum fuels in field operations. They can be produced from commonly available raw materials, i.e., air and water and are compatible with advanced turbines, reciprocating engines, and fuel cells.

The present method of producing hydrogen in such operations is the electrolysis of water into its constituent elements of hydrogen gas and oxygen gas. The efficiency of the method is primarily dependent upon and limited by the efficiency of generating the electrical energy for the electrolysis. The conversion of nuclear heat into electricity tends to be relatively inefficient. The subsequent high-pressure reaction of this hydrogen with nitrogen produced from the liquefaction or distillation of air will produce ammonia.

It is therefore an object of this invention to provide a novel process for producing hydrogen from water using a regenerable, alkali metal catalyst.

Another object of this invention is to provide a novel process for producing hydrogen-nitrogen compounds wherein the hydrogen is obtained from water using a regenerable, alkali metal catalyst.

Still another object of the invention is to provide a novel process for producing hydrogen and hydrogen-nitrogen compounds using nuclear heat to obtain the hydrogen from water with a regenerable, alkali metal catalyst.

In the present invention, hydrogen is produced for use as a fuel, or for combination with nitrogen to form a fuel, by the reaction of water and an alkali metal. The alkali metal oxide or hydroxide also produced by the reaction is then decomposed to liberate the cesium for reuse in the hydrogen producing reaction such that the only material consumed is water. The efficiency of this process is superior to that of a process using water electrolysis to produce hydrogen with a field source of electricity such as a nuclear-reactor-powered generator.

Figure 1:
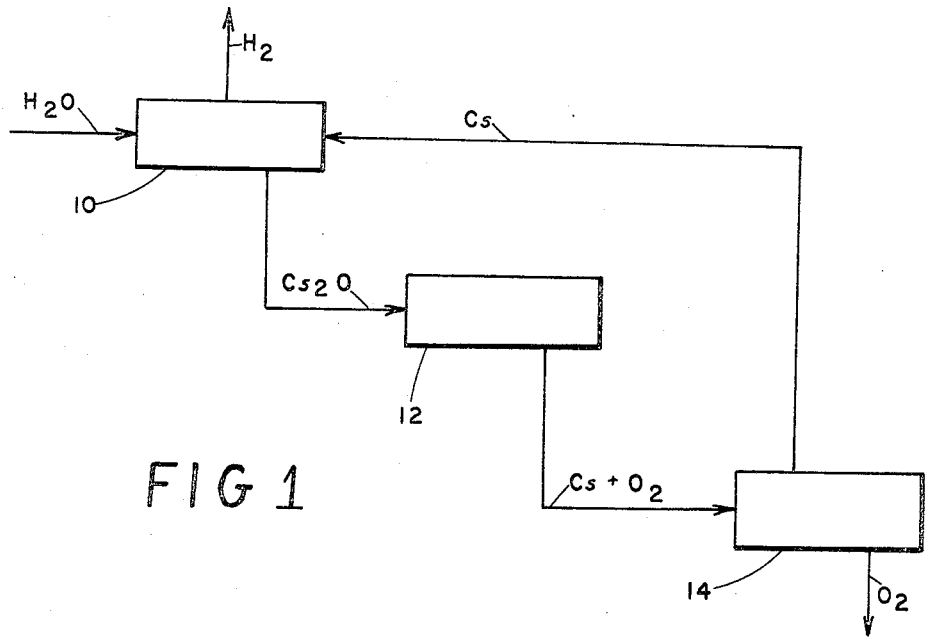
Figure 2:
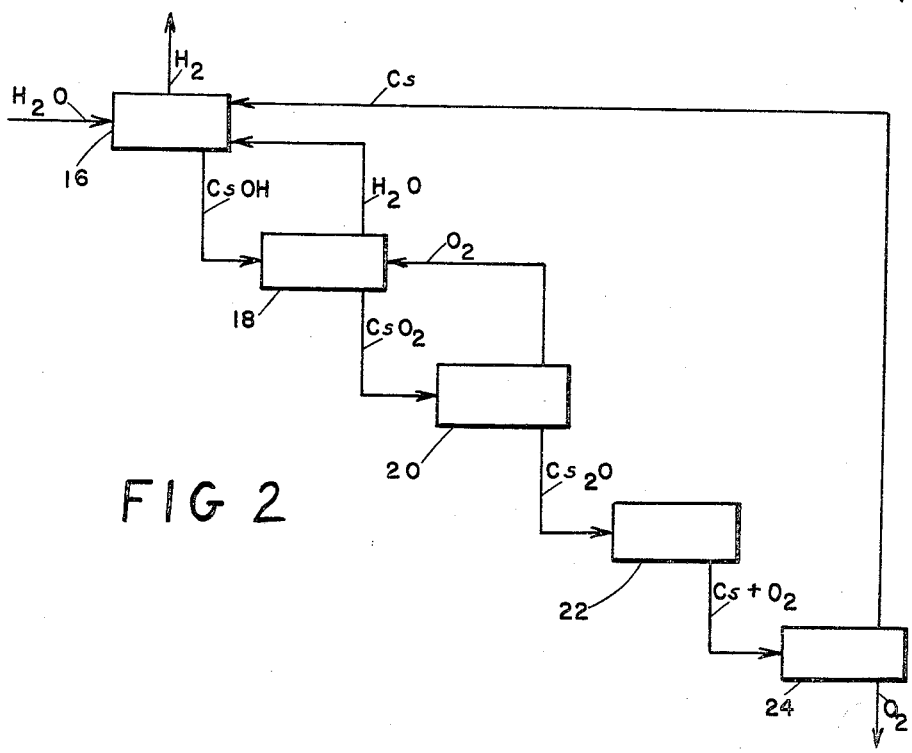

These and other objects, advantages, and features of the present invention will be apparent to those skilled in the art from the following description taken together with the appended drawings, wherein:

FIG. 1 is a schematic flow diagram of the hydrogen production process of the present invention; and FIG. 2 is a schematic flow diagram of an alternate embodiment of the hydrogen production process of the present invention.

It is known that water (steam) will react with the alkali metal to produce hydrogen gas. While each of these metals, i.e., lithium, sodium, potassium, rubidium, and cesium have similar reaction characteristics, cesium has been found to be the most desirable and will be used for illustrating the process of the present invention.

Steam and excess cesium will react exothermally according to the following reactions.

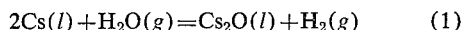
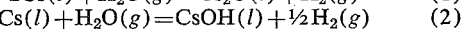
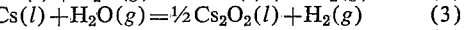
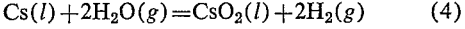

$$2Cs(l) + H_2O(g) = Cs_2O(l) + H_2(g) \quad (1)$$
$$Cs(l) + H_2O(g) = CsOH(l) + \tfrac{1}{2}H_2(g) \quad (2)$$
$$Cs(l) + H_2O(g) = \tfrac{1}{2}Cs_2O_2(l) + H_2(g) \quad (3)$$
$$Cs(l) + 2H_2O(g) = CsO_2(l) + 2H_2(g) \quad (4)$$

where:

Cs represents cesium,
H represents hydrogen,
O represents oxygen,
*l* represents a liquid phase, and
*g* represents a gaseous phase.

At temperatures between 600 and 700° Kelvin, the dissociation of steam will proceed according to either Reaction 1 or 2 to produce hydrogen gas plus either molten cesium monoxide ($Cs_2O$) or cesium hydroxide (CsOH). The free energy of formation of $Cs_2O_2$ and $CsO_2$ essentially precludes Reactions 3 and 4 from consideration. The hydrogen gas can be easily drawn off from the molten reaction products to achieve separation. Any traces of cesium which might be carried along can be removed in a hydrogen-gas scrubber.

Referring now to FIG. 1, there is shown in block diagram form the hydrogen production process cycle utilizing Reaction 1. The reaction of steam and cesium takes place in the reaction vessel 10. Hydrogen is drawn off as a gaseous product while molten cesium monoxide is transferred to a decomposition vessel 12. Molten $Cs_2O$ will thermally dissociate into its constituent elements at temperatures between 1300 to 1400° K. and pressures of less than one atmosphere. The reaction is represented as follows:

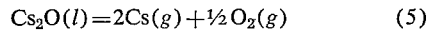

$$Cs_2O(l) = 2Cs(g) + \tfrac{1}{2}O_2(g) \quad (5)$$

wherein:

Cs represents cesium,
O represents oxygen,
*l* represents a liquid phase, and
*g* represents a gaseous phase.

A non-equilibrium thermal quench will liquefy the cesium and permit its separation from the still-gaseous oxygen in a separation vessel 14. Complete separation is not required since moderately low concentrations of cesium oxides are acceptable from a thermal-efficiency standpoint. Once separated, the cesium can be recycled for use in the hydrogen-producing reaction with steam.

An energy balance over the cesium-water hydrogen production cycle can be made on the basis of the following net reactions.

(a) Hydrogen generation:

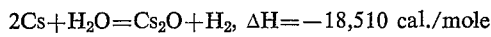

$$2Cs + H_2O = Cs_2O + H_2, \quad \Delta H = -18,510 \text{ cal./mole}$$

(b) Cesium monoxide disassociation:

$$Cs_2O = 2Cs + \tfrac{1}{2}O_2, \quad \Delta H = +99,000 \text{ cal./mole}$$

The heat of the cesium/water reaction and the sensible heat in the outgoing hydrogen stream are sufficient to heat the incoming water and cesium streams to the reaction temperature. The net process thermal requirements are 125,000 cal./gm.-mole of hydrogen required to heat and dissociate the cesium monoxide. The pump work for the oxygen-cesium separator is estimated to be 5,000 cal./gm.-mole of hydrogen. Other auxiliary power requirements and parasitic heat losses are estimated to be about 10% or 12,500 cal./gm.-mole of hydrogen. The total heat required per gm.-mole of hydrogen is therefore 142,500 cal. or 37.5 kw.-hr./lb. of hydrogen.

This amount is equivalent to 6.6 thermal kw.-hr./lb. of ammonia if ammonia is synthesized from the product hydrogen in the conventional manner; that is, air fractionation to obtain nitrogen followed by high-pressure synthesis of ammonia. By using a representative value of 6 thermal kw.-hr./lb. of ammonia required in the air-fractionation and ammonia-synthesis processes, the total estimated thermal power required to produce one pound of ammonia is 12.6 kw.-hr. Based on an ammonia heat of combustion of 9,670 B.t.u./lb. (2.83 kw. (th.)/lb.), the net process efficiency is therefore 22.5%. The process cycle of the present invention is particularly promising when compared with the 25 to 30 thermal kw.-hr. per pound of ammonia required by the water electrolysis cycle (assuming a 20% thermal-to-electrical conversion efficiency).

Referring now to FIG. 2, there is shown in block diagram form the hydrogen-production process cycle utilizing Reaction 2. The secondary reaction product of this reaction, carried out in the reaction vessel 16, is cesium hydroxide (CsOH). While CsOH cannot be directly decomposed, it can by two intermediate steps or reactions be converted into $Cs_2O$ or under some conditions $Cs_2O_2$ both of which can be decomposed into their constituent elements. The intermediate steps are:

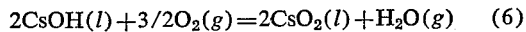
$$2CsOH(l) + 3/2 O_2(g) = 2CsO_2(l) + H_2O(g) \qquad (6)$$

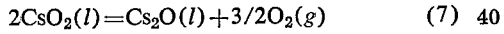
$$2CsO_2(l) = Cs_2O(l) + 3/2 O_2(g) \qquad (7)$$

where:
Cs represents cesium,
O represents oxygen,
H represents hydrogen,
$l$ represents a liquid phase, and
$g$ represents a gaseous phase.

The molten cesium hydroxide is reacted in an oxidation vessel 18 at 500° centigrade with oxygen gas to produce higher cesium oxides, primarily $CsO_2$ and $Cs_2O_2$. The water (steam) that is also evolved with Reaction 6 can be recycled back for use in Reaction 2.

The molten $CsO_2$ can then be thermally decomposed in a first decomposition vessel 20 at 700° centigrade to $Cs_2O$ and the evolved $O_2$ recycled for use in the cesium hydroxide oxidation, Reaction 6.

Both Reactions 6 and 7 are endothermic and require an external source of heat. The exothermic reaction of cesium and water, however, fortuitously produces more than sufficient heat for both the oxidation and superoxide-decomposition reactions at the required operating temperatures. To complete the cesium regeneration cycle, the molten $Cs_2O$ is thermally decomposed in a second decomposition vessel 22 and the cesium separated in a separation vessel 24 before being recycled back to the reaction vessel 16.

In this manner, hydrogen gas can be more efficiently produced with the only consumable material being water.

A source of heat, such as a small, self-sustaining nuclear reactor, is the only additional requirement. The inefficient step of conversion of nuclear heat to electricity has been eliminated.

To produce ammonia, the only other requirement is air which can be liquefacted or distilled to generate nitrogen. The subsequent high-pressure reaction of hydrogen and nitrogen gases will produce ammonia. Thus either hydrogen or ammonia can be made available for field operation consuming only readily available raw materials. The alkali metal catalyst is regenerable and therefore not consumed in the hydrogen production.

While a number of details of construction and alternate embodiments have been illustrated and described, alternatives and equivalents will occur to those skilled in the art which are within the spirit and scope of this invention. It is, therefore, desired that protection not be limited to the details illustrated and described, but only by the proper scope of the appended claims.

What is claimed is:
1. A non-electrolytic process for the production of hydrogen from water comprising:
   (1) providing steam and alkali metal to a reaction zone to produce hydrogen gas and molten alkali metal hydroxide in an exothermic reaction;
   (2) passing the molten alkali metal hydroxide to a second reaction zone where it is treated with oxygen to convert the alkali metal hydroxide to water and alkali metal dioxide;
   (3) separately removing the water and alkali metal dioxide from the second reaction zone and passing the alkali metal dioxide to a third zone where it is heated to liberate oxygen that is recycled to the second reaction zone;
   (4) removing a stream of molten alkali metal oxide from the third reaction zone to a fourth reaction zone where it is heated to provide alkali metal and oxygen;
   (5) separating the oxygen from the alkali metal and returning the alkali metal to the first-mentioned reaction zone; and
   (6) utilizing the exothermic heat of reaction and heat provided by a nuclear reactor as sole sources of energy for the process.
2. The process of claim 1 wherein the alkali metal is cesium.

References Cited

UNITED STATES PATENTS

| | | | |
|---|---|---|---|
| 683,492 | 10/1901 | Pictet | 23—220 |
| 3,287,085 | 11/1966 | Jenks et al. | 23—210 |

FOREIGN PATENTS

| | | |
|---|---|---|
| 563 | 2/1875 | Great Britain. |
| 574,360 | 1/1946 | Great Britain. |

OTHER REFERENCES

Mellor: Comprehensive Treatise on Inorganic and Theoretical Chemistry, vol. 2, 1922, p. 486, and vol. II, supplement III, 1963, p. 2346.

OSCAR R. VERTIZ, Primary Examiner

H. S. MILLER, Assistant Examiner

U.S. Cl. X.R.
23—184, 198, 220, 221